United States Patent Office 3,323,861
Patented June 6, 1967

3,323,861
PROCESS OF CALCINING SODIUM HYDROGEN FLUORIDE IN SERIALLY ARRANGED FLUIDIZABLE BEDS TO FORM SODIUM FLUORIDE AND HYDROGEN FLUORIDE
Ryo Toyabe, Onoda, and Taro Yamaguchi, Tokyo, Japan, assignors to Onoda Cement Company, Limited, Onoda, Japan
Filed July 1, 1963, Ser. No. 291,807
Claims priority, application Japan, July 25, 1962, 37/30,606
1 Claim. (Cl. 23—88)

This invention relates to a method of producing a highly concentrated gaseous product and a calcined product by thermal decomposing such a powdery, granular raw material as sulfide ores, sodium bicarbonate, sodium hydrogen fluoride, calcium carbonate or coal, which produces gaseous matter on heating at elevated temperatures above a room temperature.

An object of this invention is to provide a method of producing a highly concentrated gaseous product and a calcined product by fluidizing and thermal decomposing powdery, granular raw material.

Another object of this invention is to provide a method of producing a highly concentrated gaseous product and a calcined product by heating said raw material in such a manner as to make its thermal conductive coefficient and heat efficiency high.

Further, another object of this invention is to provide a method of heating said raw material by optionally controlling the heating temperature in order to prevent overheating it.

Still further, another object of this invention is to provide a method of heating the raw material which produces corrosive gaseous matter when heated, by using a simple and compact thermal decomposing apparatus.

Hitherto, there have been practised an indirect heating method for producing highly concentrated gaseous products and calcined products by thermal decomposing raw materials which are decomposed on heating at elevated temperature. In such an indirect heating method, the heat required for thermal decomposing the raw materials is transferred indirectly to said material through a heat-transfer surface from the heat source. The heat content to be transferred can be expressed by the product of three factors, that is, (1) the heat transfer area, (2) the average temperature difference between the temperature of the heat source and the thermal decomposing temperature of the raw material, (3) the overall heat transfer coefficient. The heat-transfer surface is desired to be as small as possible because it is considered to be the main factor for determining the capacity and construction of the thermal decomposing apparatus. Also, the average temperature difference is desired to be as small as possible, because it has effect on the heat efficiency and the construction materials of said apparatus. Therefore, it is most important to increase an overall heat transfer coefficient. If the ill-effect of the scale deposited on both sides of a heating surface may be neglected, the overall heat transfer coefficient may be determined by three factors, that is, the heat-transfer coefficient for heating surface on the heat source, the thermal conductivity and thickness of the heating surface itself, and the heat-transfer coefficient for the raw material on the heating surface. It is advantageous to make each of the three factors as large as possible.

It has been practised in the prior art to use an apparatus having a large heat-transfer coefficient for the heating surface on the heat source.

The thermal conductivity of the heating surface is a negligible factor because it has, generally, a large value as compared with the heat-transfer coefficient for the heating surface on the heat source and the heat-transfer coefficient for the raw material. In order to increase the heat-transfer coefficient of the raw material there have been practised various methods. In such a method, however, it is generally necessary to use some mechanical agitating means and, therefore, the increase of the heat-transfer coefficient for the raw material is limited depending on the construction of the agitating means. In addition, such a method has a disadvantage, particularly in heating corrosive raw materials which produce corrosive gases and corrosive calcined products, because it is necessary to employ a complicated apparatus having movable elements.

Also, there have been practised in the prior art the fluidizing methods for heating the thermal decomposing raw materials. In such methods, the thermal conductivity in question is relatively a negligible factor but they can not be applied directly to a method for producing highly concentrated gaseous products, because a large amount of a heating gas is necessary to fluidize the raw materials and a produced gaseous matter is diluted with the heating gas used. The dilution of the produced gaseous matter may be prevented to a certain extent by recycling part of it into the heating gas. It is disadvantageous to recycle the produced gaseous matter as the gaseous matter must be transported at a high temperature, the sensible heat of the produced gaseous matter is lost, air is apt to get into the gas transport device, and a transport device suitable for a corrosive gas is hardly available.

This invention has been achieved as the result of studies made for accomplishing the aforesaid objects and overcoming the disadvantages inherent in the prior art and provides a method for producing a highly concentrated gaseous product and calcined product by using a fluidizing method for thermal decomposing powdery, granular raw material.

In accordance with this invention, at first a small amount of the raw material is fluidized and thermal-decomposed by a heating gas (referred to as "the initial fluidizing gas" hereinunder) in an amount required for fluidizing the said raw material thereby to produce a thermal-decomposed gas. Said initial fluidizing gas includes, generally, any gas non-reactive with the thermal-decomposed gas, if desired, any gas which is the same as the thermal-decomposed gas, or in some case, any gas reactive with the thermal-decomposed gas. For examples, in the case of thermal decomposing of sodium hydrogen fluoride, air, nitrogen, hydrogen fluoride gas and the like are used, and in the case of thermal decomposing of sulfide ores, air, nitrogen, sulfur gas and the like are used. The resulting effluent gas is enriched with the thermal-decomposed gas and used as the second heating gas for fluidizing the second fresh raw material thereby to produce a thermal-decomposed gas. Therefore, it should be understood that the resulting secondary gas is more enriched with the thermal-decomposed gas than the former effluent gas, that is, the mixture of the second heating gas and the second effluent thermal-decomposed gas is also used as the third heating gas for fluidizing the third fresh raw material thereby to produce a thermal-decomposed gas. In accordance with this invention, the fresh raw material is always thermal decomposed by fluidizing with a heating gas which is enriched with a thermal-decomposed gas and a highly concentrated gaseous product is produced.

For a better understanding of the nature and objects of this invention, reference should be made to the following detailed description in connection with the accompanying drawings in which.

Figure 1:
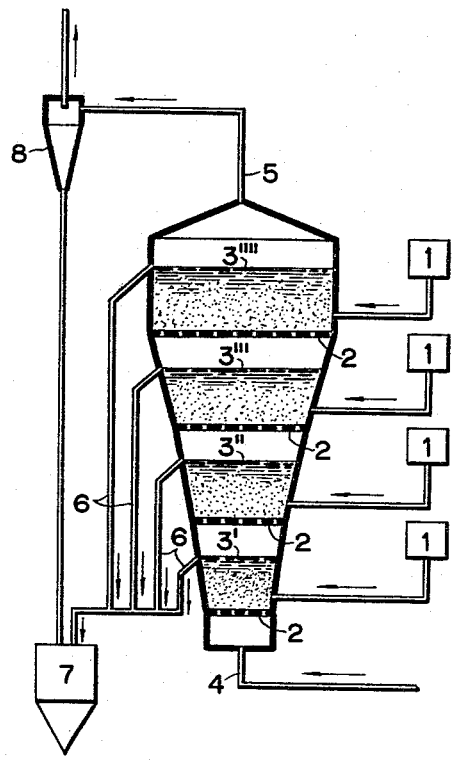
FIGURE 1 is a schematic elevational view of an apparatus having a multiple fluidizing reactor suitable for carrying out the method of this invention.
Figure 2:
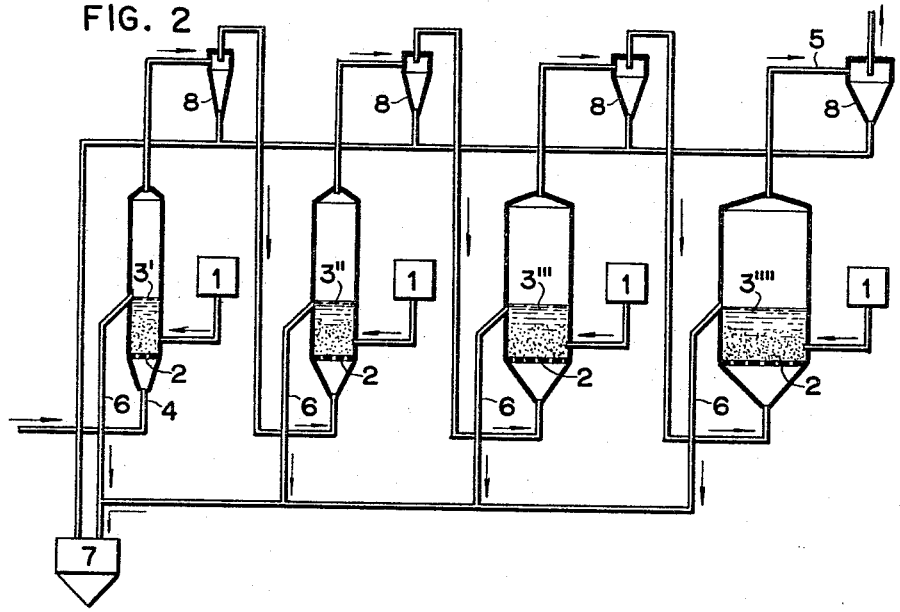
FIGURE 2 is a schematic elevational view of an apparatus having a series of a single fluidizing reactor suitable for carrying out the method of this invention.

Referring now to FIGURES 1 and 2 in which 1 is a hopper, 2 is a distributive grid, 3' is the first fluidizing bed, 3" is the second fluidizing bed, 3''' is the third fluidizing bed and 3'''' is the forth fluidizing bed. 4 is an inlet conduit for the initial fluidizing gas, 5 is an outlet conduit for the concentrated gas, 6 is an overflow conduit for a calcined product, 7 is a hopper for the calcined product and 8 is a cyclone. The charging of the raw material and the discharging of the calcined product are done into and from each of the multiple fluidized beds or the single fluidized bed of the reactor respectively. The initial fluidizing gas and the effluent gas which is enriched with the thermal-decomposed gas are passed upwardly through all the fluidized beds in the thermal decomposing apparatus. The heating can be accomplished by using either an inner heating device or an outer heating device usually used in a prior art. The construction material of the wall of the reactors varies depending on a kind of a raw material to be treated. For examples, in the cases of thermal decomposing of coal, lime and the like, the reactors are lined with a refractory material to protect the metal walls, in the case of thermal decomposing of sodium bicarbonate, the reactors are made of a steel, and in the case of thermal decomposing of sodium hydrogen fluoride, the reactors are made of anti-corrosive materials such as Monel metal and metallic nickel, or steel lined with such an anti-corrosive material.

As seen from FIGURES 1 and 2, the initial fluidizing gas is introduced at the bottom of the reactor having a multiple fluidizing bed or at the bottom of the first of the reactors arranged in a series, each having a single fluidizing bed and the raw material charged thereinto is fluidized and thermal decomposed to produce the thermal-decomposed gas. Assuming that the temperature of the fluidized bed is constant, the volume of the effluent gas increases as the initial fluidizing gas is enriched with the thermal-decomposed gas. And also the pressure of the effluent gas is more reduced than that of the initial fluidizing gas. As the result, the effluent gas expands and increases in volume. The resulting gas is introduced into the adjacent upper stage of the fluidizing beds in the reactor (FIG. 1), or the second fluidizing bed of the reactors in series (FIG. 2). The sectional area of the adjacent upper stage in the reactor and of the second reactor arranged in series must be increased in order to keep the optimum space velocity of the effluent gas constant. However, the sectional area of said adjacent upper stage and said second reactor may be optionally varied depending on the kind of a raw material and the particle size of the raw material used. Thus, the concentration of the thermal-decomposed gas in the secondary effluent gas becomes higher than that of the first effluent gas in the amount of the heat-decomposed gas. Such being the case, the final effluent gas is enriched with a thermal-decomposed gas when the apparatus as shown in FIGURE 1 or the apparatus as shown in FIGURE 2 is continuously operated.

In connection with this matter, illustration is made by way of the numerical equations for the operation of the thermal decomposing apparatus as shown in FIGURE 1.

For convenience, let us assume as follows:

(1) The optimum space velocity in each stage of the fluidizing beds is $u\,m^3/hr.$ (2) The volume of the effluent gas from each stage of the fluidizing beds is proportional to the sectional area of the stage and the proportional factor is $k\,m^3/hr.$ (3) The temperature and pressure are constant.

(4) Illustration of signs used in the numerical equations:

(1) $\overline{V}_1, \overline{V}_2 \ldots, \overline{V}_i \ldots,$ and $\overline{V}_n$ designate the gas volume (m³/hr.) at the inlet of the first stage, the second stage ..., the $i$-stage ..., and the $n$-stage respectively.

(2) $V_1, V_2 \ldots, V_i \ldots,$ and $V_n$ designate the heat-decomposed gas volume (m.³/hr.) produced in the first stage, the second stage ..., the $i$-stage ..., and $n$-stage respectively.

(3) $A_1, A_2 \ldots, A_i \ldots,$ and $A_n$ designate the sectional areas (m.²) of the first stage, the second stage ..., the $i$-stage ..., and the $n$-stage respectively.

(4) $Q_1, Q_2 \ldots, Q_i \ldots,$ and $Q_n$ designate the heat inputs (kcal/hr.) at the first stage, the second stage ..., the $i$-stage ..., and the $n$-stage respectively.

(5) $W_1, W_2 \ldots, W_i \ldots,$ and $W_n$ designate the amount of the raw material (kg./hr.) to be treated at the first stage, the second stage ..., the $i$-stage ..., and the $n$-stage respectively.

Then, the following equations are applicable in each stage of the fluid layers.

At the first stage:

$$\overline{V}_1 = A_1 U v_1 = k A_1 \therefore v_1 = \frac{k}{u}\overline{V}_1$$

Put $k/u$ to K, then $v_1 = K\overline{V}_1$.
At the second stage:

$$\overline{V}_2 = \overline{V}_1 + v_1 = \overline{V}_1(1+K)$$

At the $i$-stage:

$$\overline{V}_i = \overline{V}_{i-1}(1+K) = \overline{V}_1(1+K)^{i-1}$$

At the $n$-stage:

$$\overline{V}_n = \overline{V}_1(1+K)^{n-1}$$

Assume the effluent gas volume of the $n$-stage as $\overline{V}_{n+1}$, then $$\overline{V}_{n+1} = \overline{V}_1(1+K)^n$$

Therefore, the concentration of the thermal-decomposed gas in the final effluent gas is:

$$100\left(\frac{\overline{V}_{n+1} - \overline{V}_1}{\overline{V}_{n+1}}\right) = 100\left\{1 - \frac{1}{(1+K)^n}\right\}$$

Similarly, the following equations are appliable:

$$A_n/A_1 = (1+K)^{n-1}$$
$$Q_n/Q_1 = (1+K)^{n-1}$$
$$W_n/W_1 = (1+K)^{n-1}$$

Assume $K=1$, and $n=1, 2, 3, 4, 5$, the values of $A_n/A_1$, $Q_n/Q_1$ and $W_n/W_1$ are calculated as follows:

| Nos. of stage | Concentration (percent) | $A_n/A_1$ | $Q_n/Q_1$ | $W_n/W_1$ |
|---|---|---|---|---|
| 1 | 50 | 1 | 1 | 1 |
| 2 | 75 | 2 | 2 | 2 |
| 3 | 87.5 | 4 | 4 | 4 |
| 4 | 93.75 | 8 | 8 | 8 |
| 5 | 96.875 | 16 | 16 | 16 |

As seen from the above table, it is apparent that the effluent gas at the fourth stage of the fluid layer has a 93.75 percent concentration of the thermal-decomposed gas on the assumptions mentioned above.

On the operation of the thermal-decomposing apparatus having multiple fluidizing reactor, the dust is removed from the final effluent gas and in the operation of a thermal decomposing apparatus having a series of fluidizing reactors, the dust is removed from the effluent gas in each of said apparatus.

This invention provides many advantages as follows:

(1) being able to get desired gaseous matter in highly concentration,
(2) economical in heat consumption,
(3) required less money in construction, and
(4) especially suitable for the handling of the corrosive gas at elevated temperatures, because this apparatus required no movable mechanism such as an agitating device.

Sodium hydrogen fluoride as the raw material is illustrated as follows:

This substance is thermal-decomposed under the atmospheric pressure at a temperature of 250° C. as shown by the following equation:

$$NaHF_2 \rightarrow HF + NaF - 17.1 \text{ kcal./g. mol.}$$

Sodium hydrogen fluoride, hydrogen fluoride and sodium fluoride are corrosive and therefore it is desirable that the thermal decomposing apparatus is of simple construction. Thus, this invention is suitable for the thermal-decomposition of sodium hydrogen fluoride.

The following example is illustrative of the method of this invention.

The thermal decomposing apparatus composed of three reactors having fluidizing bed in series as shown in FIGURE 2 was used for thermal decomposing sodium hydrogen fluoride. Each of the reactors was made of iron plate lined with Monel metal, and heated with a heating medium from the outside of the reactors. Also, each diameter of three distributive grids is 0.105 meter, 0.151 meter and 0.217 meter respectively.

This invention was carried out under the conditions listed in the following table:

CONDITIONS OF THERMAL DECOMPOSING OF $NaHF_2$

| Amount of $NaHF_2$ charged, kg./hr. | | | Amount of air blowed in, m.³/hr. | Temperature of each of reactors, °C. |
|---|---|---|---|---|
| The first reactor | The second reactor | The third reactor | | |
| 2.48 | 5.45 | 11.17 | 1.56 | 250 |

AMOUNT OF CALCINED PRODUCT

| The first reactor, kg./hr. | The second reactor, kg./hr. | The third reactor, kg./hr. |
|---|---|---|
| 1.70 | 3.75 | 7.68 |

This example showed that the gas which got into the second and the third reactors, contained respectively 51.9 and 77.4 percent concentration, and the volume of the effluent gas from the third reactor was 14.4 m.³/hr. and said effluent gas contained 89.2 percent anhydrous hydrofluoric acid.

What we claim is:

A method of calcining sodium hydrogen fluoride to form sodium fluoride and to form gaseous hydrogen fluoride in high concentration, comprising arranging the sodium hydrogen fluoride in particulate form in at least two serially arranged fluidizable beds, each of said beds being disposed in a separate reaction vessel and containing a larger weight quantity of the sodium hydrogen fluoride than the preceding one of said beds, feeding a heated gas to the first of said vessels to fluidize the first of said beds and simultaneously thermally decompose the sodium hydrogen fluoride constituting the first bed, whereby a first hot effluent gas containing said gaseous hydrogen fluoride is produced, feeding said first effluent gas to the second of said reaction vessels to fluidize the second of said beds and simultaneously thermally decompose the sodium hydrogen fluoride constituting the second bed, whereby a second hot effluent gas containing said gaseous hydrogen fluoride is produced, continuing the foregoing procedure with respect to any successive fluidizable beds, whereby said effluent gases contain the gaseous hydrogen fluoride in progressively higher concentrations, removing resultant sodium fluoride from said beds, and removing the effluent gas stream from the last of the vessels, said last effluent gas stream containing the gaseous hydrogen fluoride in high concentration.

References Cited

UNITED STATES PATENTS

| | | | |
|---|---|---|---|
| 2,465,410 | 3/1949 | White | 23—1 X |
| 2,485,604 | 10/1949 | Kalbach. | |
| 2,596,954 | 5/1952 | Heath | 23—1 X |
| 2,666,526 | 1/1954 | Odell et al. | 23—1 X |
| 2,683,685 | 7/1954 | Matheson. | |
| 2,867,429 | 1/1959 | Heath | 23—142 X |
| 2,867,506 | 1/1959 | Roberts | 23—1 X |
| 3,140,152 | 7/1964 | Rucker et al. | 23—88 X |
| 3,159,455 | 12/1964 | Skaperdas et al. | 23—216 |
| 3,249,395 | 5/1966 | Levey | 23—1 |

FOREIGN PATENTS 593,047  2/1960  Canada.

OSCAR R. VERTIZ, *Primary Examiner.*

EDWARD STERN, MILTON WEISSMAN, *Examiners.*